United States Patent
Sheridan

(10) Patent No.: US 9,062,611 B2
(45) Date of Patent: Jun. 23, 2015

(54) SPLIT ACCESSORY DRIVE SYSTEM

(75) Inventor: William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 917 days.

(21) Appl. No.: 13/276,838

(22) Filed: Oct. 19, 2011

(65) Prior Publication Data

US 2013/0098058 A1    Apr. 25, 2013

(51) Int. Cl.
*F01D 25/20* (2006.01)
*F01D 25/18* (2006.01)
*F02C 7/32* (2006.01)
F02C 7/36 (2006.01)

(52) U.S. Cl.
CPC . *F02C 7/32* (2013.01); *F01D 25/18* (2013.01); F02C 7/36 (2013.01); F05D 2260/98 (2013.01); F05D 2260/4031 (2013.01); *F01D 25/20* (2013.01)

(58) Field of Classification Search
CPC .............. F02C 7/32; F02C 7/36; F01D 25/18; F01D 25/20; F05D 2260/98; F05D 2260/4031
USPC ............ 60/802, 783, 39.08; 184/6.11; 244/58
See application file for complete search history.

(56) References Cited

U.S. PATENT DOCUMENTS

| | | | |
|---|---|---|---|
| 4,722,666 A | 2/1988 | Dennison et al. | |
| 5,694,765 A * | 12/1997 | Hield et al. | 60/39.163 |
| 6,467,725 B1 * | 10/2002 | Coles et al. | 244/58 |
| 7,377,110 B2 | 5/2008 | Sheridan et al. | |
| 7,805,947 B2 | 10/2010 | Moulebhar | |
| 8,456,051 B2 * | 6/2013 | Raad | 310/83 |
| 2006/0101804 A1 * | 5/2006 | Stretton | 60/226.1 |
| 2008/0178833 A1 * | 7/2008 | Restivo et al. | 123/196 R |
| 2009/0123274 A1 | 5/2009 | Chaudhry | |
| 2009/0302152 A1 * | 12/2009 | Knight | 244/58 |
| 2010/0024434 A1 * | 2/2010 | Moore et al. | 60/788 |
| 2010/0158670 A1 * | 6/2010 | Fox | 415/118 |
| 2010/0242496 A1 * | 9/2010 | Cass et al. | 60/802 |
| 2011/0030385 A1 * | 2/2011 | Ellans et al. | 60/786 |
| 2011/0314830 A1 * | 12/2011 | Legare | 60/772 |
| 2012/0144841 A1 * | 6/2012 | Short et al. | 60/783 |
| 2014/0090386 A1 * | 4/2014 | Cloft et al. | 60/772 |

* cited by examiner

*Primary Examiner* — William H Rodriguez
*Assistant Examiner* — Carlos A Rivera
(74) *Attorney, Agent, or Firm* — Kinney & Lange, P.A.

(57) ABSTRACT

A gas turbine engine includes a spool, a first accessory gearbox, a second accessory gearbox, and a scavenge pump. The first accessory gearbox is connected to and driven by the spool. The second accessory gearbox is connected to and driven by the first accessory gearbox. The scavenge pump is connected between the first accessory gearbox and the second accessory gearbox. The first accessory gearbox drives the second accessory gearbox through the scavenge pump.

17 Claims, 3 Drawing Sheets

SPLIT ACCESSORY DRIVE SYSTEM

BACKGROUND

The present invention relates to gas turbine engines, and in particular, to accessory drive systems on gas turbine engines.

In gas turbine engines, an accessory gearbox is typically used to drive one or more accessories. In some gas turbine engines, the accessory gearbox is positioned inside of a core cowling. However, inside the core cowling is typically a relatively hot environment, which can damage and/or negatively affect the operation of certain accessories positioned inside the core cowling. Moreover, it can be difficult to access accessories inside the core cowling for service, which is undesirable for accessories that require frequent service. In other gas turbine engines, the accessory gearbox is positioned outside of the core cowling, such as in a fan nacelle. However, the accessory gearbox and certain accessories mounted to the gearbox can be relatively large. This can cause the fan nacelle to also be undesirably large, and thus undesirably increase fan nacelle drag.

SUMMARY

According to the present invention, a gas turbine engine includes a spool, a first accessory gearbox, a second accessory gearbox, and a scavenge pump. The first accessory gearbox is connected to and driven by the spool. The second accessory gearbox is connected to and driven by the first accessory gearbox. The scavenge pump is connected between the first accessory gearbox and the second accessory gearbox. The first accessory gearbox drives the second accessory gearbox through the scavenge pump.

Another embodiment of the present invention is a method for driving accessories on a gas turbine engine. The method includes driving a scavenge pump via a first accessory gearbox, driving a second accessory gearbox via the scavenge pump, and driving a supply pump via the second accessory gearbox.

DETAILED DESCRIPTION

Figure 1:
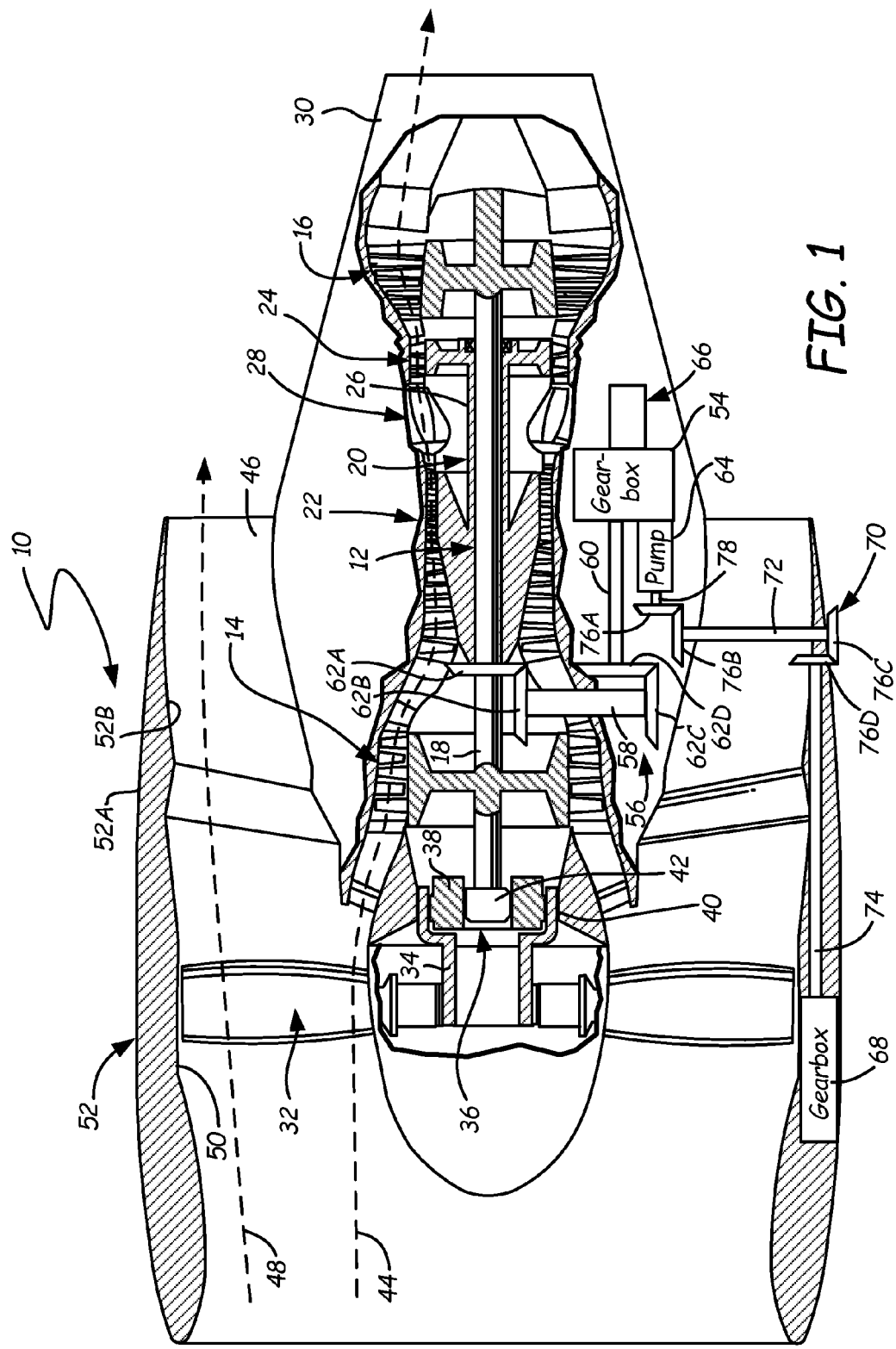
FIG. 1 is a schematic cross-sectional side view of a gas turbine engine.

FIG. 1 is a schematic cross-sectional side view of gas turbine engine 10. Gas turbine engine 10 is a turbofan engine and includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), combustor 28, core cowling 30, fan 32, and fan shaft 34. In the embodiment shown in FIG. 1, low pressure spool 12 is coupled to fan shaft 34 via fan drive gear system 36 (which includes star gear 38, ring gear 40, and sun gear 42). Sun gear 42 is attached to and rotates with low pressure shaft 18. Ring gear 40 is rigidly connected to fan shaft 34 which turns at the same speed as fan 32. Star gear 38 is coupled between sun gear 42 and ring gear 40 such that star gear 38 revolves around sun gear 42 when sun gear 42 rotates. When low pressure spool 12 rotates, fan drive gear system 36 causes fan shaft 34 to rotate at a slower rotational velocity than that of low pressure spool 12. In alternative embodiments, fan 32 can be connected to low pressure spool 12 in a manner other than by fan drive gear system 36.

Air flows from fan 32, through low pressure compressor 14, high pressure compressor 22, combustor 28, high pressure turbine 24, and low pressure turbine 16 along main flow path 44. Air also flows from fan 32 through fan bypass 46 along bypass flow path 48. Fan bypass 46 is bounded at its inner diameter (ID) by core cowling 30 and at its outer diameter (OD) by fan case 50. Fan nacelle 52 has radially outer surface 52A and radially inner surface 52B. Fan nacelle 52 is positioned on fan case 50, with fan case 50 being part of radially inner surface 52B.

Main accessory gearbox 54 is connected to high pressure spool 20 via gear system 56. Gear system 56 includes tower shaft 58, lay shaft 60, and bevel gears 62A-62D. Bevel gear 62A is fixedly connected to high pressure shaft 26. Bevel gears 62B and 62C are fixedly connected at opposite ends of tower shaft 58. Bevel gear 62D is fixedly connected to lay shaft 60. Bevel gear 62A is coupled to bevel gear 62B and bevel gear 62C is coupled to bevel gear 62D such that high pressure shaft 20 drives main accessory gearbox 54 when high pressure spool 20 rotates. Scavenge pump 64 and other accessories 66 are mounted to and driven by main accessory gearbox 54. Fan bypass 46 is positioned between main accessory gearbox 54 and second accessory gearbox 68.

Second accessory gearbox 68 is connected to scavenge pump 64, and consequently to main accessory gearbox 54, via gear system 70. Gear system 70 includes tower shaft 72, lay shaft 74, and bevel gears 76A-76D. Bevel gear 76A is fixedly connected to scavenge pump shaft 78. Bevel gears 76B and 76C are fixedly connected at opposite ends of tower shaft 72. Bevel gear 76D is fixedly connected to lay shaft 74. Bevel gear 76A is coupled to bevel gear 76B and bevel gear 76C is coupled to bevel gear 76D such that scavenge pump 64 drives second accessory gearbox 68 when scavenge pump 64 rotates. Additional accessories are mounted to second accessory gearbox 68, as further described with respect to FIG. 2.

Figure 2:
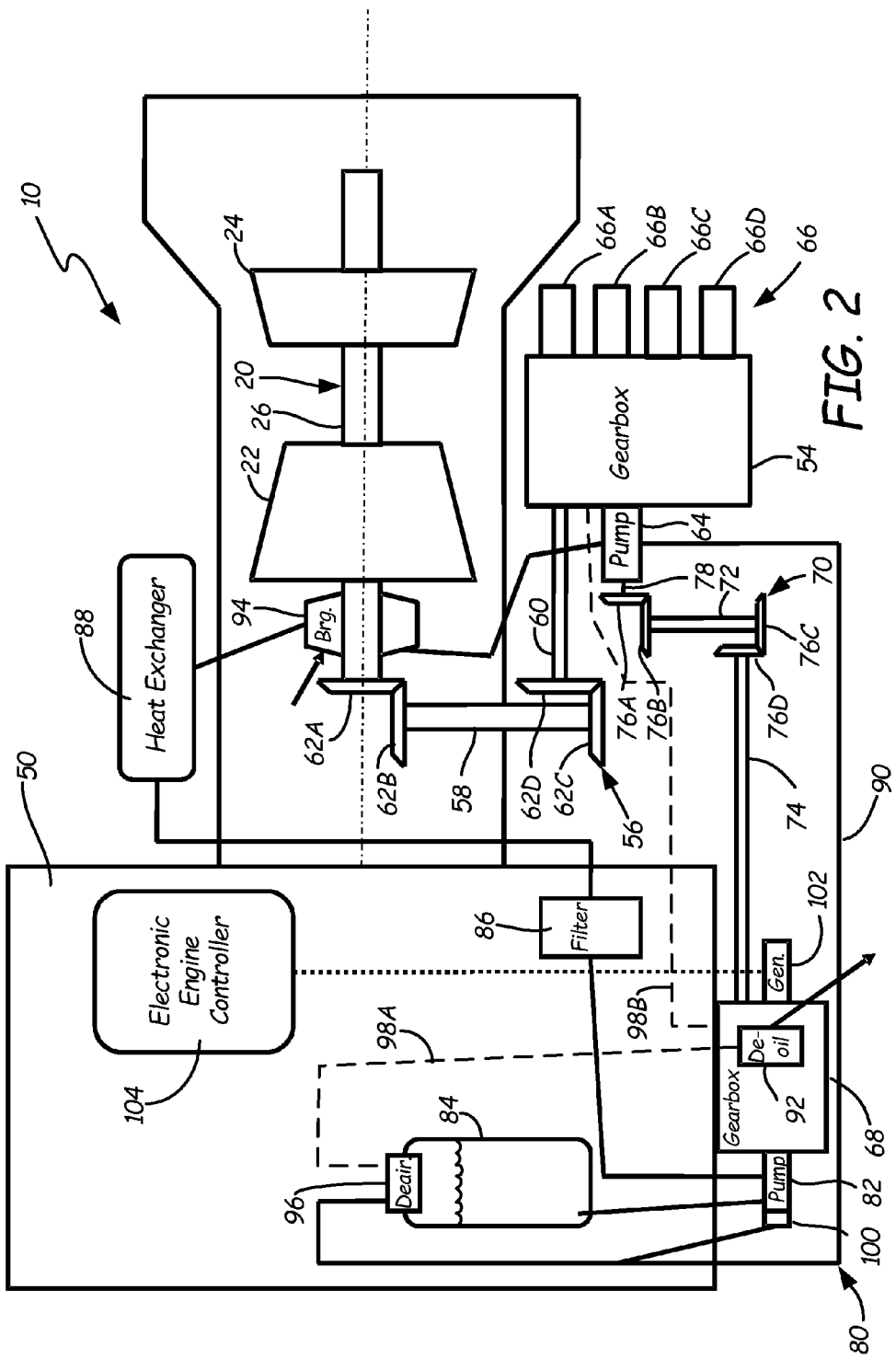
FIG. 2 is a schematic side view of the gas turbine engine of FIG. 1, showing a lubrication system.

FIG. 2 is a schematic side view of gas turbine engine 10, showing lubrication system 80. Lubrication system 80 includes scavenge pump 64, supply pump 82, oil tank 84, filter 86, heat exchanger 88, all connected by lubrication circuit 90, and deoiler 92. Lubrication system 80 supplies lubricating liquid to and scavenges lubricating liquid from various gas turbine engine components, such as bearing compartment 94 and supply pump 82 itself. Though not illustrated for simplicity, lubrication system 80 can supply lubricating liquid to virtually any gas turbine engine component that benefits from lubricating liquid, such as those having gears and bearings.

Supply pump 82 is a pressure oil pump mounted to and driven by second accessory gearbox 68. Supply pump 82 receives lubricating liquid from oil tank 84 and supplies that lubricating liquid through filter 86, through heat exchanger 88, and to bearing compartment 94 where it lubricates and cools bearings (not shown) that support high pressure shaft 26. Air from inside core cowling 30 (shown in FIG. 1) can also leak into bearing compartment 94. Scavenge pump 64 scavenges a mixture of lubricating liquid and air from bearing compartment 94 and returns it to oil tank 84. When the mixture of lubricating liquid and air is returned to oil tank 84, it is first passed through deaerator 96 to separate the air from the lubricating liquid. Lubricating liquid remains in oil tank 84 while the separated air is delivered to deoiler 92 via vent passage 98A. Deoiler 92 is positioned in second accessory gearbox 68. Deoiler 92 further separates lubricating liquid from air and vents the separated air overboard to atmosphere. Air from main accessory gearbox 54 is vented to second accessory gearbox 68 via vent passage 98B, then to deoiler 92, and then overboard to atmosphere.

Because supply pump 82 has its own gears and bearings (not shown), it too requires lubricating liquid to lubricate those gears and bearings. Supply pump 82 has a small scavenge element 100 which scavenges lubricating liquid from supply pump 82 and returns it to oil tank 84.

Permanent magnet generator 102 is also mounted to and driven by second accessory gearbox 68. Electronic engine controller 104 is powered by permanent magnet generator 102. Like second accessory gearbox 68, each of supply pump 82, oil tank 84, filter 86, deoiler 92, permanent magnet generator 102, and electronic engine controller 104 are positioned on fan case 50, substantially inside fan nacelle 52 (shown in FIG. 1), allowing for relatively easy access to each for repair and maintenance. In alternative embodiments, more or fewer components can be mounted on fan case 50.

Accessories 66 include generator 66A, fuel pump 66B, hydraulic pump 66C, and starter 66D all connected to and driven by main accessory gearbox 54. Accessories 66 are all mounted to main accessory gearbox 54 and positioned radially inside core cowling 30 (shown in FIG. 1). In alternative embodiments, accessories 66 can differ from those illustrated. For example, generator 66A and starter 66D can be combined as a starter/generator. Second accessory gearbox 68 is smaller than main accessory gearbox 54. Similarly, accessories mounted to second accessory gearbox 68 (such as supply pump 82 and permanent magnet generator 102) are generally smaller than some of the relatively large accessories 66 mounted to main accessory gearbox 54 (such as generator 66A, fuel pump 66B, hydraulic pump 66C, and starter 66D). This allows for fan nacelle 52 to house second accessory gearbox 68 while retaining a relatively small profile and having a relatively limited amount of fan nacelle drag during flight.

When lubrication system 80 is operating normally, rotation of scavenge pump 64 drives gear system 70, which drives second accessory gearbox 68, which drives supply pump 82 to supply lubricating liquid to bearing compartment 94 and other components. If scavenge pump 64 fails, stopping rotation of scavenge pump shaft 78, then supply pump 82 will also stop rotating. It can be undesirable to supply lubricating liquid to components when there is no scavenge pump operational to scavenge the lubricating liquid from the components. Allowing lubricating liquid to build up can be dangerous and harmful to gas turbine engine 10. Thus, this arrangement can create a fail-safe situation which prevents supply pump 82 from operating except when scavenge pump 64 is also operating.

Figure 3:
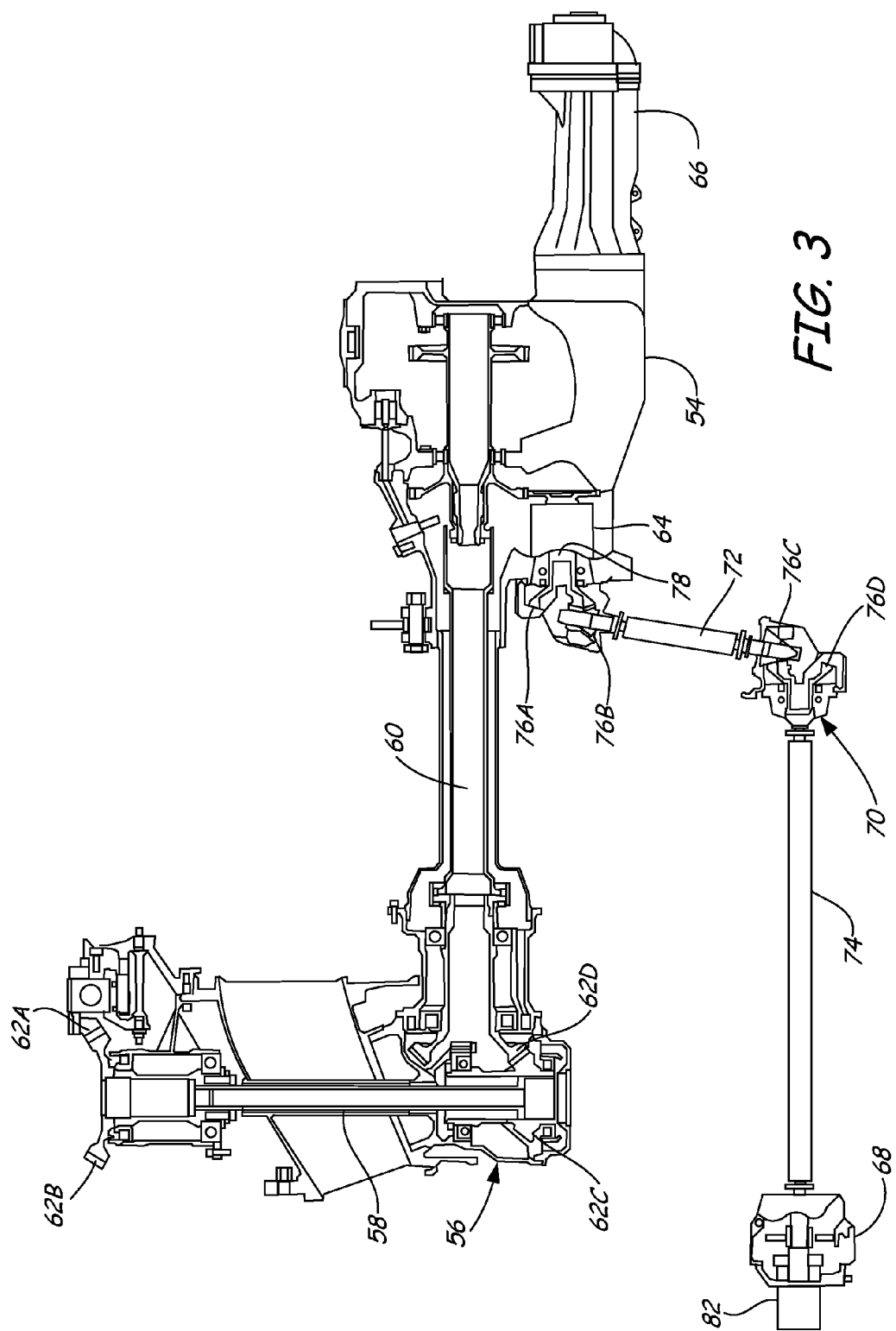
FIG. 3 is a partial schematic view of gear systems used in the gas turbine engine of FIG. 1.

FIG. 3 is a partial schematic view of gear systems 56 and 70. FIG. 3 illustrates in greater detail one embodiment of gear systems 56 and 70 connecting to main accessory gearbox 54 and second accessory gearbox 68. As shown, shafts 58, 60, 72, and 74 as well as bevel gears 62A-62D and 76A-76D can be sized and shaped in a matter suitable for each of their respective connections. In alternative embodiments, gear systems 56 and 70 can be varied as necessary for a particular application.

Thus, the systems described above allow for two accessory gearboxes to be located in different parts of gas turbine engine 10: main accessory gearbox 54 being positioned inside core cowling 30 and second accessory gearbox 68 being positioned outside of core cowling 30 on fan case 50. This allows for certain accessories to be positioned inside core cowling 30 while other accessories are positioned in fan nacelle 52. Accessories that benefit from being positioned in a relatively cool environment can be positioned in the nacelle. Similarly, accessories that benefit from being positioned in a location suitable for relatively easy access by service personnel can also be positioned in the nacelle. Accessories that are relatively large and/or have relatively large power requirements can be positioned inside the core cowling on main accessory gearbox 54. By connecting scavenge pump 64 between main accessory gearbox 54 and second accessory gearbox 68, lubrication system 80 can fail-safe in the event of a failure of scavenge pump 64.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, lubrication circuits 90 need not be connected precisely as illustrated in FIG. 2 but can be modified as necessary for particular applications. Similarly, lubrication system 80 can include one or more additional pumps, valves, filters, sensors, or other components. Moreover, scavenge pump 64 need not necessarily be mounted directly to main accessory gearbox 54 as illustrated, so long as it is connected between main accessory gearbox 54 and second accessory gearbox 68.

The invention claimed is:

1. A gas turbine engine comprising:
    a spool;
    a first accessory gearbox connected to and driven by the spool and positioned substantially inside a core cowling;
    a second accessory gearbox connected to and driven by the first accessory gearbox and positioned substantially outside of the core cowling on a fan case;
    a scavenge pump connected between the first accessory gearbox and the second accessory gearbox, wherein the first accessory gearbox drives the second accessory gearbox through the scavenge pump;
    a supply pump connected to and driven by the second accessory gearbox;
    an oil tank positioned on the fan case;
    an oil filter positioned on the fan case; and
    a lubrication circuit connecting the scavenge pump, the supply pump, the oil tank, and the oil filter.

2. The gas turbine engine of claim 1, wherein the second accessory gearbox is positioned within a nacelle on the fan case.

3. The gas turbine engine of claim 1, and further comprising:
    a generator connected to and driven by the first accessory gearbox;
    a fuel pump connected to and driven by the first accessory gearbox;
    a hydraulic pump connected to and driven by the first accessory gearbox; and
    a starter connected to and driven by the first accessory gearbox.

4. The gas turbine engine of claim 3, and further comprising:
    a permanent magnet generator connected to and driven by the second accessory gearbox; and an electronic engine controller powered by the permanent magnet generator and positioned on the fan case.

5. The gas turbine engine of claim 1, wherein the scavenge pump is mounted to the first accessory gearbox.

6. The gas turbine engine of claim 1, and further comprising:
- a first gear system connecting the spool to the first accessory gearbox; and
- a second gear system connecting the scavenge pump to the second accessory gearbox.

7. The gas turbine engine of claim 6, wherein the second gear system comprises:
- a first bevel gear connected to a shaft of the scavenge pump;
- a tower shaft having second and third bevel gears, wherein the second bevel gear is connected to the first bevel gear; and
- a lay shaft having a fourth bevel gear connected to the third bevel gear, wherein the lay shaft is connected to and drives the second accessory gearbox.

8. The gas turbine engine of claim 1, wherein the gas turbine engine is a turbofan engine, and further comprising:
- a fan bypass positioned between the first accessory gearbox and the second accessory gearbox.

9. The gas turbine engine of claim 1, wherein the second accessory gearbox is smaller than the first accessory gearbox.

10. A method for driving accessories on a gas turbine engine, the method comprising:
- driving a scavenge pump via a first accessory gearbox that is positioned substantially inside a core cowling;
- driving a second accessory gearbox that is positioned substantially outside of the core cowling on a fan case via the scavenge pump;
- driving a supply pump via the second accessory gearbox; and
- flowing a lubricating liquid through a lubrication circuit that includes the scavenge pump, the supply pump, an oil tank positioned on the fan case, and an oil filter positioned on the fan case.

11. The method of claim 10, wherein the first accessory gearbox is connected to and driven by a spool of the gas turbine engine via a first gear system and wherein the second accessory gearbox is connected to and driven by the scavenge pump via a second gear system.

12. The method of claim 10, wherein the second accessory gearbox fails to drive the supply pump in response to a failure of the scavenge pump.

13. The method of claim 10, and further comprising:
- pumping a lubricating liquid to a plurality of gas turbine engine components via the supply pump; and
- scavenging the lubricating liquid from the plurality of gas turbine engine components via the scavenge pump.

14. The method of claim 10, and further comprising:
- driving a generator, a fuel pump, a hydraulic pump, and a starter via the first accessory gearbox; and
- driving a permanent magnet generator via the second accessory gearbox.

15. The method of claim 10, wherein the scavenge pump is mounted to the first accessory gearbox.

16. The method of claim 10, and further comprising:
- separating a fluid into the lubricating liquid and a mixture; and
- venting the mixture from the first accessory gearbox to the second accessory gearbox.

17. The method of claim 16, and further comprising:
- separating the mixture into the lubricating liquid and air; and
- venting air from the second accessory gearbox through a deoiler positioned on the second accessory gearbox.

* * * * *